United States Patent Office 3,158,663
Patented Nov. 24, 1964

3,158,663
LATEX FOAM STABILIZED WITH AN ALKYLATED POLYETHER-POLYTHIOETHER GLYCOL
Hanswilli von Brachel, Cologne-Sulz, Heinz Esser, Cologne-Stammheim, and Gustav Sinn, Bergisch Neukirchen, Germany, assignors to Farbenfabriken Bayer Aktiengesellschaft, Leverkusen, Germany, a corporation of Germany
No Drawing. Filed July 27, 1960, Ser. No. 45,562
Claims priority, application Germany July 28, 1959
5 Claims. (Cl. 260—723)

Two processes are known for the production of foam rubber from rubber or synthetic rubber dispersions ("latex"). In one of these processes, the so-called blowing process, hydrogen peroxide and catalysts which split off oxygen, such as for example yeast, are added to the latex. By this means, the latex is expanded by evolution of oxygen into a foam which coagulates by freezing at temperatures from −10 to −30° C., while retaining its foam structure. By subsequent heating to 100–120° C., this gelled foam is vulcanised with the aid of added vulcanisers. In contrast to the blowing process, there is the so-called beating process in which the latex, with addition of soaps, is transformed by impact with air into a foam which is then coagulated on standing with sodium silico-fluoride or other slowly acting coagulating agents, without losing its structure. Vulcanisation is also carried out in this process subsequent to coagulation by adding vulcanisers at temperatures from 100 to 120° C. The difficulty which arises with both processes is the preparation of a stable and still liquid foam which does not collapse prior to the gelling or coagulation.

It has now been found that polysulphonium compounds are suitable for stabilising foams consisting of natural rubber or synthetic rubber dispersions.

The polysulphonium compounds used for the process according to the invention contain 2 to 100 preferably 2 to 30 sulphonium groups and advantageously have a molecular weight higher than 300. It is advantageous to use those compounds of which the molecular weight is between approximately 400 and 20,000. Examples of polysulphonium compounds used in accordance with the invention are described in German Patent 880,485 and Belgian Patent 513,099. It is advantageous to use polyether-polythioether-polysulphonium compounds. These polysulphonium compounds can be linear or branched. The sulphonium groups can be linked to one another by alkylene, alkylene ether or alkylene thioether radicals. The alkylene, alkylene ether or alkylene thioether groups can moreover contain for example ester, acetal, urethane, urea, sulphoxide or sulphone groups. Such polysulphonium compounds can be prepared by alkylation of sulphur bridges in the corresponding polythioethers with alkylation agents such as for example with alkyl sulphates, sulphonic acid alkyl esters, alkyl phosphates or alkyl halides such as dimethylsulphate, diethylsulphate, sulphonic acid methyl or ethyl ester, benzylchloride, methyliodide or methyl, ethyl or butyl phosphate. On account of their good availability and the excellent efficacy of the polysulphonium compounds prepared therefrom, the polyether-polythioethers which are preferred as starting materials are those which are produced by condensation of dihydroxy alkyl sulphides with polyalkylene glycols in the presence of dehydration catalysts at temperatures of from 100 to 250° C. Such compounds are for example described in French Patent specification 1,201,171 and can be obtained by reacting polyether glycols of the general formula:

$$HO-(CHR_1CHR_2O)_m-R-O-(CHR_3CHR_4O)_n-H$$

in which R represents an alkylene, cycloalkylene (such as cyclohexylene) or arylene (such as phenylene) radical which can carry hydroxyl groups, and wherein said alkylene radical can contain up to 20 carbon atoms, and wherein $R_1$ to $R_4$ each represents hydrogen atom or a low alkyl group which contains up to 4 carbon atoms, and wherein $m$ and $n$ are whole numbers, the sum of which is at least 2 and can amount to approximately 100, in the presence of dehydration catalysts at temperatures from 140 to 220° C. with thioether glycols of the general formula:

$$HO-(CHR_1CHR_2-S-CHR_3CHR_4O)_p-H$$

in which $R_1$, $R_2$, $R_3$ and $R_4$ represent a hydrogen atom or like or different alkyl, cycloalkyl, or aryl radicals, while $p$ represents a whole number for example from 1 to 100 or preferably 1 to 50.

Dihydroxyalkyl sulphides which have proved especially suitable in this case are thiodiglycol, β,β-dimethyl thiodiglycol, β,β-diphenyl thiodiglycol, as well as their condensates with themselves. Mentioned as polyalkylene glycols are: polyethylene or polypropylene glycols, copolymers of ethylene and propylene oxides as well as the hydroxy alkylation products of glycols, such as for example butane-1,3-diol and butane-1,4-diol, pentane-1,5-diol, hexane-1,6-diol, octadecane-1,12-diol, octadecen-1,12-diol and hydroquinone. The polyalkylene glycols can also be replaced in the condensation with the hydroxy alkyl sulphides, by hydroxyalkylation products of monohydric and polyhydric alcohols or finally also by these alcohols themselves.

Other examples of the polythioethers are polyethylene sulphide, the copolymers of ethylene sulphide and glycide or the reaction products of dichlorethane with sodium sulphide or β,β-dichlorodiethyl ether.

The stabilisers used according to the invention can be added to the rubber or plastic emulsions or dispersions (latices) in quantities from 0.1 to 10% by weight, advantageously 0.3 to 3% by weight, related to 100 parts by weight of the dry rubber substance. It is of no significance for the efficacy of the foam stabiliser whether the dispersions are first of all foamed with the conventional constituents of the mixture and then the foam stabilisers are added or whether the stabiliser is added together with the other constituents of the mixture to the dispersions and then the foam is produced.

The compounds used according to the invention prevent a collapse of the foam and guarantee a completely uniform pore structure, even with very slow freezing and with thick moulded articles. In a similar manner, the foams produced by the beating process also have finer and more uniform pores on addition of the polysulphonium compounds, whereas smaller weights per unit volume can be more easily adjusted than is the case without the stabilisers which are claimed herein.

*Example 1*

From 50 to 80 parts of 10% hydrogen peroxide, 0.5 to 1 part of yeast and 7 parts of a 15% solution of a polysulphonium compound, (prepared as hereinafter described), are added to a latex mixture having the following composition:

167 parts of natural latex=100 parts of dry rubber substance,
5.0 parts of zinc oxide,
2.0 parts of sulphur,
1.0 part of zinc diethyl dithiocarbamate,
0.8 part of dihydroxydiphenyl,
8.8 parts of a 5% solution of a condensation product of sodium salt of naphthalene sulphonic acid and formaldehyde the components are thoroughly mixed and immediately poured into a mould. There is immediate vigorous evolution of oxygen, whereby the foam is expanded. As soon as the foam has reached the required volume, it is cooled to −10 to −30° C. In this operation, the expanded foam retains its volume and coagulates in homogeneous manner. It is then vulcanised in the usual manner by heating to 100–120° C. The finally vulcanised foam has completely uniform pores.

The polysulphonium compound which is used is prepared in the following manner:

1344 parts of thiodiglycol,
1800 parts of polypropylene glycol,
16 parts of o-phosphoric acid and
30 parts of maleic acid anhydride are heated in a distillation apparatus while stirring in a carbon dioxide atmosphere to 175° C. until 330 parts of water have distilled off and the residue has a hydroxyl number of 69 and an acid number of 7, corresponding to a molecular weight of 1450. This operation generally takes about 5 hours. 220 parts of dimethyl sulphate are added dropwise to 100 parts of this condensate in the course of about 1 hour at 80° C. and the temperature is thereafter maintained for 1 hour at 80° C. The resulting, thickly liquid, light yellow oil is then neutralised with normal sodium hydroxide solution and diluted with water to a concentration of 150 parts of polysulphonium compound per 1000 parts.

*Example 2*

The following mixture is prepared:

167 parts of natural latex=100 parts of dry rubber substance,
1.0 part of age resistor (diphenylamine derivative),
7.0 parts of sodium oleate, 10%, dissolved in water,
3.0 parts of alkyl sulphonate, 10%, dissolved in water,
2.5 parts of zinc oxide,
2.5 parts of colloidal sulphur,
0.8 part of zinc diethyl dithiocarbamate,
1.0 part of mercaptobenzimidazole,
1.1 parts of sodium silicofluoride,
2.5 parts of sodium salt of methylene-bis-naphthalene sulphonic acid,
30.0 parts of water and
8.0 parts of a polysulphonium compound, 15%, dissolved in water (prepared according to Example 1).

This mixture is beaten to a foam in the usual manner and then vulcanised for 30 minutes at 100° C. It is possible in this way to produce foams having extremely low weights per unit volume and fine uniform pores.

*Example 3*

Maintaining the experimental conditions and mixing ratios indicated in Examples 1 and 2, the polysulphonium compounds described therein are replaced by the following polysulphonium compounds:

(a) A mixed condensate having an average molecular weight of 15,000 and prepared from 1500 parts of thiodiglycol and 1800 parts of a copolymer of ethylene oxide and propylene oxide in the molar ratio 1:8 (molecular weight 500) in the presence of 30 g. of phosphoric acid, which has been made ternary with 30% by weight of dimethyl sulphate.

(b) A mixed condensate with the average molecular weight 2500, prepared from 1300 parts of β,β-dimethyl thiodiglycol and 1800 parts of oxethylated butanediol with the molecular weight 300, which has been made ternary with 35% by weight of diethyl sulphate.

(c) A mixed condensate with the average molecular weight 1300, prepared from 1400 parts of thiodiglycol, and 1600 parts of polypropylene glycol (molecular weight 350), made ternary with 35% by weight of triethyl phosphate.

(d) A mixed condensate of 548 parts of hydroxyethylated dodecyl alcohol (molecular weight 274) and 244 parts of thiodiglycol, made ternary with 32% by weight of dimethyl sulphate.

(e) A mixed condensate of the average molecular weight 4000, prepared from 1000 parts of hydroxyethylated resorcin of the molecular weight 800 and 400 parts of thiodiglycol, made ternary with 20% by weight of dimethyl sulphate.

(f) A copolymer made ternary with 25% by weight of dimethyl sulphate and having the molecular weight 1500, and prepared from 44 parts of ethylene oxide, 100 parts of propylene oxide, 66 parts of ethylene sulphide, 11.8 parts of hexane-1,6-diol, and 400 parts of dioxane in the presence of 0.2 part by weight of sodium by heating for 5 hours to 150° C., distilling off the dioxane and subsequently made ternary at 80° C.

We claim:

1. In a process wherein a natural rubber latex is converted into a foam and the latter is then coagulated and vulcanized to a solid foam rubber, the improvement which comprises stabilizing the foamed latex so that it does not collapse prior to coagulation by incorporating therein as a foam stabilizer a polysulfonium compound which is prepared by the alkylation of polyether-polythioether glycols, said polyether-polythioether glycols being prepared by reacting at a temperature of 140–220° C. in the presence of a dehydration catalyst (1) a polyether glycol of the general formula:

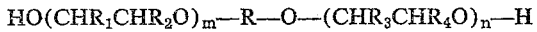

in which R is selected from the group consisting of an alkylene, a cycloalkylene, and an arylene radical which can carry hydroxyl groups and wherein $R_1$ to $R_4$ represent a member selected from the group consisting of a hydrogen atom and a lower alkylene group and wherein $m$ and $n$ are whole numbers, with (2) a thioether glycol of the general formula:

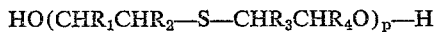

in which $R_1$, $R_2$, $R_3$ and $R_4$ represent a member selected from the group consisting of hydrogen, alkyl, cycloalkyl and aryl radicals, while $p$ represents a whole number.

2. The process of claim 1 wherein said foam stabilizer is prepared by the alkylation of a polyether-polythioether obtained by the condensation of thiodiglycol with polypropylene glycol.

3. The process of claim 1 wherein said foam stabilizer is prepared by alkylating with dimethyl sulfate a polyether-polythioether obtained by the condensation of thiodiglycol with polypropylene glycol.

4. The process of claim 1 wherein said foam stabilizer is prepared by alkylating with dimethyl sulfate a polyether-polythioether obtained by the condensation of thiodiglycol with an ethylene oxide/propylene oxide copolymer.

5. The process of claim 1 wherein said foam stabilizer is prepared by alkylating with triethyl phosphate a polyether-polythioether prepared by the condensation of thiodiglycol and polypropylene glycol.

References Cited in the file of this patent

UNITED STATES PATENTS

| | | |
|---|---|---|
| 2,457,684 | Klemp | Dec. 28, 1948 |
| 2,563,383 | Vaughan et al. | Aug. 7, 1951 |
| 2,568,866 | Osterhof et al. | Sept. 25, 1951 |
| 2,617,840 | Eckert | Nov. 11, 1952 |
| 3,070,584 | Von Brachel | Dec. 25, 1962 |
| 3,087,899 | Esser et al. | Apr. 30, 1963 |

OTHER REFERENCES

Nollar: Chemistry of Organic Compounds, W. B. Saunders and Company, Philadelphia, Copyright 1951, page 96.